United States Patent [19]
Ducaroir et al.

[11] Patent Number: 5,956,370
[45] Date of Patent: Sep. 21, 1999

[54] WRAP-BACK TEST SYSTEM AND METHOD

[75] Inventors: Francois Ducaroir, Santa Clara; Rong Pan, Stanford; Krishnan Ramamurthy, Santa Clara, all of Calif.

[73] Assignee: LSI Logic Corporation, Milpitas, Calif.

[21] Appl. No.: 08/586,173

[22] Filed: Jan. 17, 1996

[51] Int. Cl.$^6$ .................................................... H04B 1/44
[52] U.S. Cl. ........................... 375/221; 375/358; 370/249; 370/366
[58] Field of Search ..................................... 375/220, 221, 375/222, 224, 358, 377; 370/249, 366, 506

[56] References Cited

U.S. PATENT DOCUMENTS

| | | |
|---|---|---|
| 4,048,445 | 9/1977 | Ghisler . |
| 4,071,887 | 1/1978 | Daly et al. .............................. 395/309 |
| 4,271,513 | 6/1981 | Maejima et al. ........................ 371/20.5 |
| 4,308,472 | 12/1981 | McLaughlin . |
| 4,402,075 | 8/1983 | Bargeton et al. .................... 370/249 X |
| 4,419,633 | 12/1983 | Phillips . |
| 4,486,739 | 12/1984 | Franaszek et al. ........................ 371/59 |
| 4,529,979 | 7/1985 | Kusama et al. .................... 340/825.05 |
| 4,564,933 | 1/1986 | Hirst . |
| 4,573,017 | 2/1986 | Levine . |
| 4,575,841 | 3/1986 | Fagerstedt et al. . |
| 4,575,864 | 3/1986 | Rice, Jr. et al. . |
| 4,613,979 | 9/1986 | Kent . |
| 4,631,719 | 12/1986 | Huffman et al. ........................ 370/249 |
| 4,675,886 | 6/1987 | Surie . |
| 4,748,623 | 5/1988 | Fujimoto . |
| 4,751,469 | 6/1988 | Nakagawa et al. . |
| 4,806,878 | 2/1989 | Cowley . |
| 4,908,819 | 3/1990 | Casady et al. .......................... 370/204 |
| 4,920,546 | 4/1990 | Iguchi et al. . |
| 4,975,916 | 12/1990 | Miracle et al. ........................ 371/47.1 |
| 4,979,185 | 12/1990 | Bryans et al. ........................... 375/293 |
| 4,988,901 | 1/1991 | Kamuro et al. . |
| 5,010,559 | 4/1991 | O'Connor et al. ...................... 375/368 |
| 5,025,458 | 6/1991 | Casper et al. ........................... 375/365 |
| 5,028,813 | 7/1991 | Hauck et al. . |
| 5,040,195 | 8/1991 | Kosaka et al. ........................... 375/365 |
| 5,043,931 | 8/1991 | Kovach et al. ........................... 364/579 |
| 5,052,026 | 9/1991 | Walley ..................................... 375/373 |
| 5,088,112 | 2/1992 | Pyhalammi et al. ................ 375/377 X |
| 5,111,451 | 5/1992 | Piasecki et al. ......................... 370/294 |
| 5,126,690 | 6/1992 | Bui et al. . |
| 5,159,279 | 10/1992 | Shenoi et al. . |
| 5,180,993 | 1/1993 | Dent . |
| 5,200,979 | 4/1993 | Harris ..................................... 375/292 |
| 5,251,217 | 10/1993 | Travers et al. . |
| 5,265,089 | 11/1993 | Vonehara ................................ 370/249 |
| 5,268,652 | 12/1993 | Lafon . |
| 5,274,668 | 12/1993 | Marschall ................................ 375/224 |
| 5,299,236 | 3/1994 | Pandula ................................... 375/368 |
| 5,301,207 | 4/1994 | Emerson et al. .................... 370/249 X |
| 5,327,103 | 7/1994 | Baron et al. . |
| 5,337,306 | 8/1994 | Hall ......................................... 370/249 |
| 5,343,461 | 8/1994 | Barton et al. ........................... 370/249 |
| 5,353,250 | 10/1994 | McAdams .......................... 365/189.03 |
| 5,379,409 | 1/1995 | Ishikawa . |
| 5,398,270 | 3/1995 | Cho et al. . |
| 5,448,571 | 9/1995 | Hong et al. ............................. 370/514 |
| 5,473,758 | 12/1995 | Allen et al. ............................. 395/430 |
| 5,481,543 | 1/1996 | Veltman ................................. 370/473 |
| 5,550,802 | 8/1996 | Worsley et al. ..................... 370/254 X |
| 5,559,854 | 9/1996 | Suzuki . |
| 5,577,039 | 11/1996 | Won et al. .............................. 370/466 |

Primary Examiner—Young T. Tse

[57] ABSTRACT

A wrap back test system and method for providing local fault detection within a section of an integrated I/O interface core device on an integrated circuit is disclosed. The system and method of this invention is suitable for use in any I/O interface having both a transmitter and a receiver section. The wrap back of input test data, prior to reformatting for transmission, to the receiver's data alignment stage permits fault detection within the core of an integrated I/O interface. By illustration, in a serializer/deserializer I/O, the wrap back of alignment pattern encoded parallel data, prior to serialization, to the receiver's data alignment stage permits identifying faults in just this portion of the I/O transceiver. The wrap back test system and method of this invention permits fault isolation of within the boundaries of the I/O core and independent of external logic or testers.

20 Claims, 3 Drawing Sheets

WRAP-BACK TEST SYSTEM AND METHOD

CROSS REFERENCES TO RELATED APPLICATIONS

This application is being filed concurrently with the following applications, and these are incorporated herein by reference: U.S. patent application Ser. No. 08/596,816, filed on Feb. 5, 1996, to Ramamurthy, et al. for a FAST SYNCHRONIZATION METHOD; U.S. patent application Ser. No. 08/597,896, filed on Feb. 5, 1996, to Krishnan Ramamurthy, Ross MacTaggart and Francois Ducaroir for a HIGH SPEED PHASE LOCKED LOOP TEST METHOD AND MEANS; U.S. patent application Ser. No. 08/586,171, filed on Jan. 17, 1996, to John Daane for a METHOD FOR INTERLEAVING NETWORK TRAFFIC OVER SERIAL LINES; U.S. patent application Ser. No. 08/586,172, filed on Jul. 17, 1996, to Krishnan Ramamurthy, Rong Pan, and Francois Ducaroir for a SELF TEST OF CORE WITH UNPREDICTABLE LATENCY, now abandoned; U.S. patent application Ser. No. 08/586,174, filed on Jan. 17, 1996, to Krishnan Ramamurthy, Rong Pan, and Francois Ducaroir for a LOOP-BACK TEST SYSTEM AND METHOD, now U.S. Pat. No. 5,587,114; and U.S. patent application Ser. No. 08/596,174, filed on Feb. 5, 1996, to Krishnan Ramamurthy, Marc Miller Rong Pan and Francois Ducaroir for a PROGRAMMABLE SYNCHRONIZATION CHARACTER.

FIELD

This invention relates to systems and methods for testing electronic circuits and, more particularly, to such systems and methods for on-chip wrap-back diagnostics of an integrated core input/output interface circuitry including serializer/deserializer I/O, analog/digital I/O, and high-speed telecommunications inverse multiplexor I/O.

BACKGROUND

Integrated circuits are becoming increasingly more complex as more core devices and supporting logic are integrated onto a single chip. This is driven, in part, from the need to provide increased functionality in less space, with lower power consumption and with higher bandwidths. These product performance requirements force integrated circuit designers to populate a single chip with several devices which may include controllers, memory blocks, processors, and various input/output (I/O) interfaces to provide a complex integrated circuit.

As an example, improvements in microprocessor performance has resulted in data transfer bandwidths that typically outpace I/O transfer rates. In the telecommunications industry, for example, high speed telecommunications data is converted into multiple low-speed T1 data paths for transmission and then reconverted to the high-speed data at the receiver. As another example, analogue signals are routinely converted to a digital signal, transmitted, and then reconverted back to the analog signal.

Similarly, parallel data I/O bus bottlenecks result in performance compromises in peripheral and network interfaces, and accordingly have spurred the development of high-speed serial transfer methods. Unlike conventional protocols where data is transferred over multiple conducting traces or wires, parallel data is converted into a high-speed, serial data stream. The serial data stream is typically converted back to parallel data be a deserializer at a receiving peripheral device for application with the particular logic in that device. Integration of such I/O interfaces as part of a complex integrated circuit on a single chip is consistent with proximally locating the serializer/deserializer I/O with the devices that are either transmitting or receiving the data, thus avoiding I/O bus bandwidth limitations and enabling higher data transfer rates. The integration of increasing numbers of functional devices onto a single chip and the resulting complex interconnectivity requirements of these devices with other devices on and off the chip has resulted in the integration of high-speed serializer/deserializer I/O interface cores or macrocells onto the chip containing the customers logic.

High levels of device integration onto a single chip, while reducing the chip count on a board, will increase the unit cost of the integrated circuit. This is principally due to lower manufacturing yields resulting from the increased process complexities associated with the manufacture of such highly integrated devices, as well as the yield impact attendant with the additional process steps required to fabricate these chips. Accordingly, it is well known that the likelihood of manufacturing defects increases as chip complexity increases. Core device tolerances become increasingly critical as the devices are packed closer together and are required to operate and interact at higher bandwidths. Deviation from these tolerances can cause defects in the chips resulting in lower process yields, increased screening of finished goods, resulting in higher per unit costs. Also, the additional process steps associated with the fabrication of these highly integrated circuits provide further opportunities for defects and thus increased cost due to lower manufacturing yields.

The high cost of manufacturing these complex integrated circuits makes it desirable, therefore, to identify product defects as early in the manufacturing process as possible, thus avoiding the expense of further processing an otherwise defective chip. Also, early manufacturing rejection of defective parts reduces the amount of screening required of the finished product. Accordingly, where an I/O interface is incorporated as a core device on an integrated circuit, it is desirable to test the I/O interface during the manufacture, or as shortly thereafter as possible, of the integrated circuit to determine if the I/O interface is operating to specification before additional time and money are expended to complete the fabrication of what might otherwise be a defective device, or to avoid costs associated with installation of a defective device onto a board.

Currently there are no commercially available testers capable of testing an embedded, high-speed I/O interface at the I/O interface design limits. Current testing devices and hardware are limited to data transfer rates of up to about 500 Mb/sec. Consequently, serializer/deserializer I/O interfaces capable of data transfer rates exceeding 500 Mb/sec cannot be tested to the limits of the I/O interface's data transfer rate performance specification on testers that are commercially available today. To compound the problem, merely testing the I/O interface at a commercially available tester's highest data transfer rate is not an acceptable solution because many high-speed I/O interface devices are incapable of operating at the relatively lower speeds limiting these testers. Further, even if the device could be tested at these lower data rates, such a test is not indicative of the integrity or quality of the I/O interface device since it is not being tested at its full operating data transfer rate. Accordingly, testing of embedded I/O interface devices using commercially available testers is not possible, and confirmation of the operability and performance of the embedded I/O is not possible until the chip on which the I/O is assembled is at least assembled at the board level, at which time any defect detected becomes more core costly to repair or replace.

Currently, wrapback testing of high-speed serializer/deserializer I/O interfaces cannot be performed within the I/O macrocell. Such testing may only be performed on nonintegrated I/O components where interconnectivity between the nonintegrated components permit such testing, or is performed in combination with either other chips on a completed card or as part of the entire communications system in which the card is component (such testing of components external to the serializer/deserializer I/O interface is more appropriately termed "loopback" testing). With this method of testing, it cannot be determined which chip on a card or which device on a chip is defective in the event a fault is detected. As a result, either the entire board is discarded or further testing is required in order to identify the defective board component so that it might be replaced. Such fault testing is not optimal in the sense that significant cost can be avoided if it can be determined that the I/O interface is defective early in the manufacture of the component chip containing the I/O interface core, or before assembly of that chip onto a board.

Accordingly, there is a need for on-chip diagnostics systems and methods for core I/O interface devices, including serializer/deserializer I/O interfaces, inverse multiplexer telecommunications interfaces, and analog/digital interfaces so that defects may be detected early during the manufacturing process.

Kovach et al., U.S. Pat. No. 5,043,931, teaches a wrap back diagnostic capability on analog-to-digital conversion systems, for example audio digitizing capture and playback adapter boards or cards. They teach a connector system on an I/O card having a first state wherein digital-to-analog converter (DAC) outputs are automatically, internal to the card, routed to corresponding analog-to-digital converter (ADC) inputs thereby closing a wrap loop whereupon automated DAC to ADC loop tests are performed. They also teach a second switching state which is provided automatically upon insertion of connector plugs (such as miniature audio plugs) into the connector system whereby the loop is broken and the DAC outputs and ADC inputs are made available externally to respective output and input connectors for normal operation of the card. Their system will detect board-level I/O faults only after the component chips have been fabricated and assembled onto the card. Their system does not provide for detecting defects in the I/O interface or other integrated core devices, thus precluding wrapback testing of the during manufacture of the I/O chip, or of an embedded I/O core in an integrated circuit prior to its assembly onto a circuit board.

Marshall, U.S. Pat. No. 5,274,668, teaches using the demodulator circuit of his invention as a component in a signal processing circuit. The signal processing circuit is shown as consisting of several integrated circuits including a digital transmitter-receiver integrated circuit as an additional board component. The digital transmitter-receiver integrated circuit is shown as having an internal feedback loop going from the output of the tansmitter to the input of the receiver. Data looped back from the transmitter is compared off-chip in a processor circuit with the original data. This test is unsuitable for the early detection of defects in the manufacturing process in a core I/O interface of an integrated cireuit. As taught, this test scheme requires two separate integrated circuits. The signal comparison in this circuit is performed by a different, separate integrated circuit (the "processor") thus making possible the loop-back test only after the board has been assembled. Consequently, early manufacturing loop-back testing of the digital transmitter-receiver core cannot be performed during the manufacturing of the transmitter-receiver core since the additional processor integrated is required to perform the test.

Other wrap-back and loop-back diagnostic systems are typified by Barton et al., U.S. Pat. No. 5,343,4611. They describe a facility-level loop-back test, diagnostic and maintenance system having a digital transmission facility, transmission medium, and at least one microprocessor-based, full duplex facility loop-back diagnostics interface located at predetermined end-user locations within their system. Their system is intended to fault test an entire system, such as a local area network, wide area network, or telephone system. Their system fault testing will not identify faults up to the I/O interface circuit. A failed circuit within the I/O interface circuit will not be detected by this system or any other system wherein the loop-back or wrap back is performed off-chip and includes external elements such as transmission lines, wires, fiber-optic cable, other logic, and the like. In the event a fault was detected, these external elements would introduce uncertainty as to which element may have failed.

Other background art is directed to loop-back and wrap-back testing schemes of data communication systems whereby such testing does not interfere with the availability of the communications system. Casady et al., U.S. Pat. No. 4,908,819, is directed to a an integrated data voice multiplxer (IDVM) capable of simultaneously supporting loop-back and communication handshake protocols with no performance degradation. He shows a wide-area like network wherein data is transmitted using frequency shift keyed modulation of two or more carrier signals. The presence or absence of crrier signals is used to indicate a loop-back state. Their invention is directed to a completed, installed macro-system, and improves over Barton et al and the like, by providing for loop-back testing without interfering with the availability of the system.

There is a need to provide an on-chip self-test wrap-back test system in an I/O interface core of an integrated circuit to provide a means for fault testing the I/O interface circuit so that the defective I/O interface circuit may be identified as early as possible in the manufacturing process. Further, a wrap-back test within the I/O interface core of an integrated circuit is needed in order to provide resolution sufficient to identify an operational fault with the I/O interface in the event a system fault is determined to have occurred.

THE INVENTION

Objects:

It is among the objects of this invention to provide a wrapback self test system in an I/O interface device integrated into an integrated circuit to permit early detection of I/O interface defects during its manufacture, or prior to assembly of the integrated circuit onto a board, and to enable wrap-back fault detection at an intra-chip resolution.

It is another object of this invention to provide a method for performing wrap-back testing in an I/O interface circuit core integrated into an integrated circuit to permit early detection of I/O interface defects during its manufacture, or prior to assembly of the integrated circuit onto a board, and to enable wrap-back fault detection at an intra-chip resolution.

Still other objects, features, aspects and advantages of the present invention will become apparent from the following Summary and Detailed Description of the present invention, when taken in conjunction with the accompanying drawings.

Summary:

This invention is directed to on-chip diagnostics, including wrap-back testing of an embedded I/O interface macrocell or core on an integrated circuit. A core is defined as a fully defined, optimized, and reusable block of logic, which supports industry-standard functionality, and has predefined timing and layout. The integrated circuit may consist of a plurality of core devices or it may be as simple as at least one I/O interface circuit. A wrap-back test is defined as a performance test of a portion of the core domain. Data is diverted entirely within the core domain for the purpose of ascertaining the proper functioning of predetermined blocks or sections of the core. Proper performance of these sections is determined by comparing the integrity of the wrapped-back test data with the original test data. A wrap-back test typically intercepts test data and routes it to the output of the core prior to subjecting the test data to all of the functional elements of the core.

Any I/O interface which chances the attributes of the data being transmitted may benefit from the wrapback system and method of this application. By way of example and not by limitation, the system and method of this invention may be applied to inverse multiplexers commonly used in the telecommunications industry to wrap back the high speed test data before it is multiplexed to the separate T1 channels, or in analog/digital I/Os to wrap back just the analog portion of the I/O.

By way of illustration and not by limitation, the wrap-back system and method of this invention is exemplified by application to a fill-duplex transceiver I/O core having a serializer/deserializer I/O interface. In this embodiment, parallel data is received into a serializer portion of the I/O core where it is serialized, stored in a transmit buffer, and exits the transmit buffer as serial data at a data rate equal to the product of the width of the parallel stream and the parallel data rate. The receiver portion of the I/O interface receives serial data into a receive buffer, directs the stored data into a deserializer where it is converted to parallel data, the parallel data is directed into a data alignment unit (DAU) where a reference clock signal is extracted from the serial data, and the parallel data is realigned and synchronized with the reference clock. This I/O interface core may be integrated as a core device on an integrated circuit having other core logic from which I/O parallel data is generated or applied, or it may be integrated as a core device on an integrated circuit either as a stand-alone I/O circuit or as an array of such I/O devices.

In the wrap-back mode, a wrap-back request is asserted to the I/O core causing parallel test data entering the transmitter serializer to be diverted, prior to being serialized, directly to the DAU. The parallel test data exiting the DAU is compared to the original parallel test data that was supplied to the transmit serializer. Test data may be supplied to the transmitter portion of the I/O interface either externally or by test data stored in a built-in self-tester (BIST). The BIST may optionally provide an error output signal to indicate when the sent and received data do not match, and an error counter and error trace buffer may be used to help identify the nature of the error and the bit-error rate. The output of the error counter and error trace buffer may be made available by means of a dedicated output bus.

A feature of this invention is that the wrap-back test is performed on the digital portion of the I/O circuit, while the analogue portions (the serializer and the deserializer) are bypassed. Further, the analogue portions may be powered down or powered-up depending upon the nature of the wrap-back test performed.

A feature of the fully self-contained wrap-back test of this invention is that it allows for the capability of testing the I/O core in an integrated circuit prior to completion of the chip manufacturing process, or shortly thereafter and prior to assembly of the chip onto a board. This capability not only avoids the added cost of having to repair or reject an entire board, but also allows testing of the I/O circuits at the design data transfer rate. By having the ability to perform a totally on-chip wrap-back test to test the I/O core, chips having defective I/O interfaces may be rejected relatively early in the manufacturing process. This not only avoids the time and costs associated with the later screening of finished goods, but also reduces the overhead associated with the further manufacture of defective product, including additional process and test equipment and machine operators.

An additional advantage of the on-chip wrap-back test of this invention is that the wrap-back inputs may be taken off-chip, thus allowing external logic to enable the core's parallel wrapback mode. Since test data may be supplied either internally as pseudo-random data, or externally, the test is at the full operational bandwidth of the I/O interface. This ability to request a wrap-back test of the I/O interface is permitted by making accessable the wrap-back request inputs of the core as available pins on the integrated circuit.

As high-speed serial communications becomes more prevalent, particularly in backplane connectivity in systems with multiple boards, in chip-to-chip connectivity on the same board, and in core-to-core connectivity between devices on the same chip, the current wrap-back tests as described in the background art beome inadequate. Diagnostic tests which merely identify faults relating to communication elements external to the system, such as transmission cables and remote terminals, do not have the required resolution to isolate faults within the system such as between boards, between chips, or between core devices within a chip. Given the complexity of the chips, boards and systems currently in use today, loop-back tests and wrap-back tests capable of providing such resolution are desirable for intra-system diagnostics. The capability of accessing the wrap-back test mode of the I/O core is desirable, for example, where the integrated circuit containing the I/O interface having the on-chip wrap-back test of this invention has been placed in service and such a test becomes necessary as part of a maintenance protocol to identify faults to a chip-level or intra-level resolution.

DRAWINGS

The invention is illustrated by reference to the drawings, in which.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Figure 1:
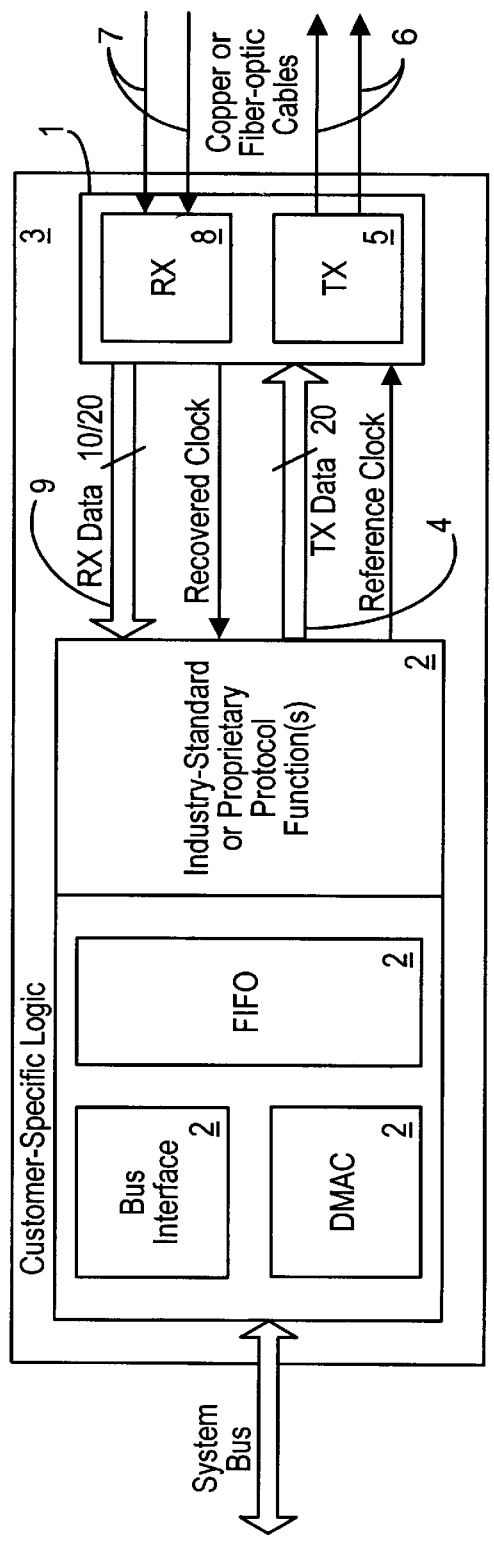
FIG. 1 shows a system block diagram of a typical integrated circuit having an I/O serializer/deserializer interface core integrated thereon.

FIG. 1 is a system block diagram showing an I/O interface core 1 integrated with other logic devices 2 on an integrated circuit chip 3. Parallel data 4 from other integrated logic devices 2 is received by the transmitter portion 5 of the I/O interface core 1, is converted to serial form, and exits the transmitter portion 5 as serial data 6 for serial communication with off-chip external elements. Although, the parallell data shown is ten bits wide to aid in preserving the direct current balance of the circuit, it is understood that the parallel data can be of any width for purposes of the wrap back test.

Figure 2:
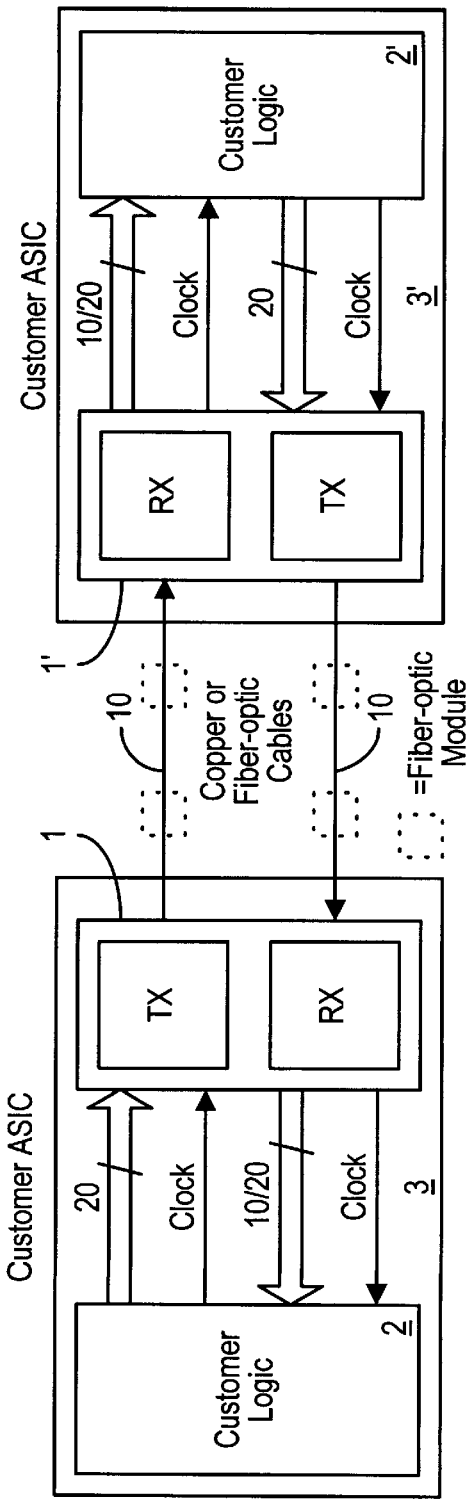
FIG. 2 illustrates the interconnectivity of two integrated circuits each having an I/O serializer/deserializer interface core integrated thereon.

Serial data 7 is received by the receiver portion 8 of the I/O interface and is converted into parallel data 9, and the alignment pattern and reference clock signal is extracted. The reconverted parallel data is aligned and exits the receiver portion 8 for parallel communication with the other integrated logic devices 2. FIG. 2 shows two integrated circuits 3, 3' having an I/O interface core 1, 1' integrated into each chip, in serial communication with one another. The transmission means 10 includes wire, fiber optics, microwaves, and the like. The customer logic 2, 2' may be a single core device or be comprised of a plurality of core devices operatively connected with one another and to the I/O interface to provide a specific application or function.

Figure 3:
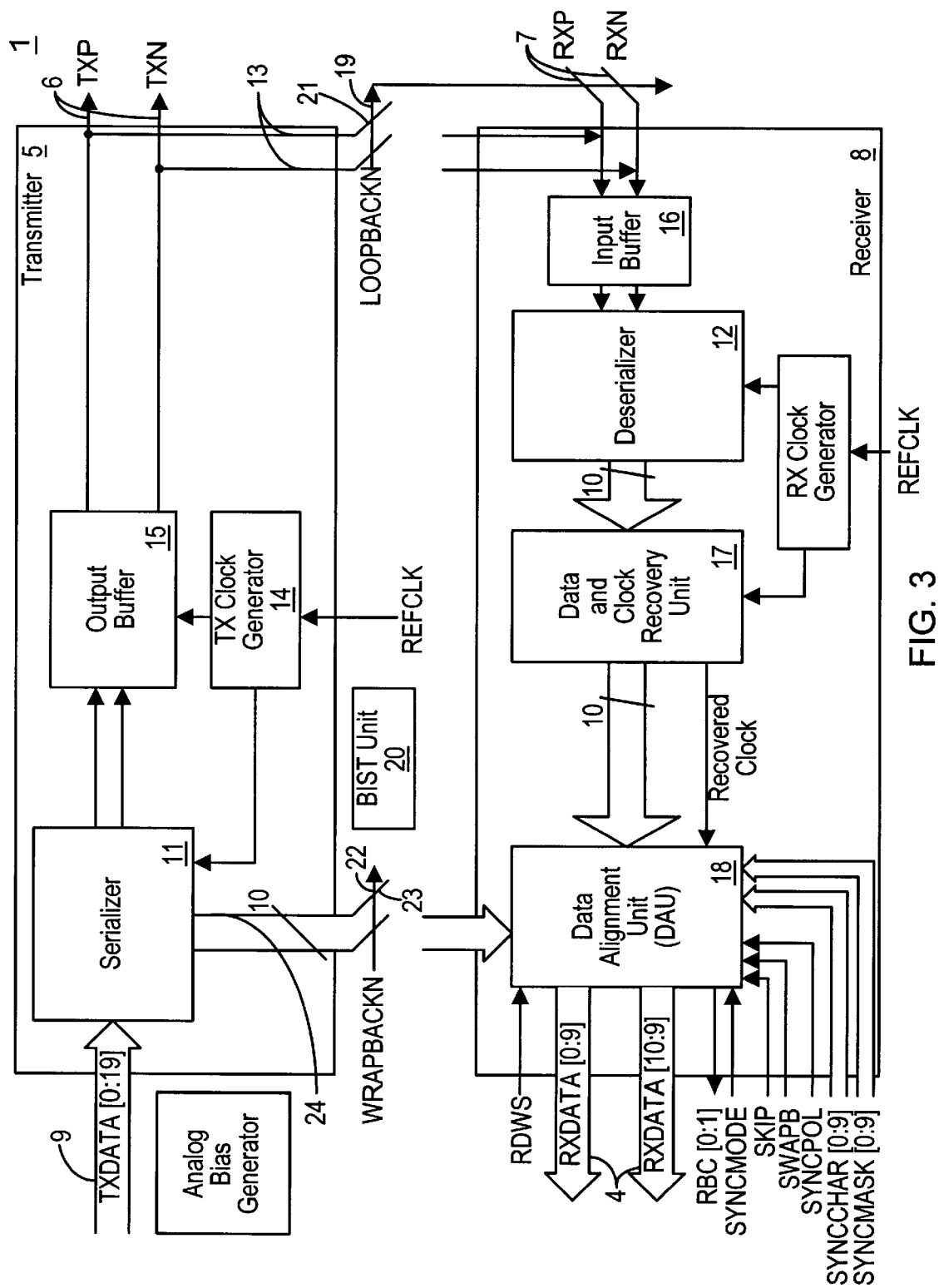
FIG. 3 is a block diagram of an I/O serializer/deserializer interface core incorporating the wrap-back system of this invention.

FIG. 3 is a core block diagram of an I/O circuit embodying the wrap-back system of this invention. During normal operation alignment pattern encoded parallel data from either other core devices on the chip, or from an external device is clocked into the serializer portion 11 of the transmitter portion 5 of the I/O interface 1, the clock signal being provided by the clock generator 14. The serial data is conveyed to the transmit output buffer 15 where it is then transmitted as a transmit serial data pair 6, for receipt by a serial data receiver.

Incoming serial data is received as a receive serial pair 7 and is directed into a serial data input buffer. The serial data is moved from the buffer into a deserializer 12 where it is converted to parallel data, and the embedded alignment pattern is recovered in the data and Clock Recovery Unit 17. The parallel data is aligned with the recovered alignment pattern in a Data Alignment Unit and exits the I/O core as synchronized parallel data 4.

The parallel data wrap-back mode wraps alignment pattern encoded parallel data from the tranmitter prior to serialization of the data to the receiver. This mode permits testing the functionality of all but the serializer and deserializer portions of the core, that is, all of the digital portion and some of the analog portion of the core are tested. Referring to FIG. 3, to initiate the wrap-back test mode, a request for wrap-back test is asserted from off-chip to generate a wrapback test request signal 22. Pseudo-random or other alignment pattern encoded parallel test data may be supplied from off-chip or alternately, the parallel test data may be supplied on-chip by a built-in self test (BIST) unit 20. An internal wrap-back switching circuit 23 redirects the test parallel data, prior to the data being serialized, via traces 24 to the DAU 18. The switching circuit 23 may be of any type designed to shunt the parallel data to the DAU. Such designs are known by persons skilled in electronic circuit design. The devices used in the circuit include FET, bipolar, or other semiconductor device combinations also known by those of skill in the art. The switching circuit is designed to ensure a D.C. balance in the circuit. The test parallel data is compared to the original input test data 9 to determine the bit error rate of the digital portions of the I/O core interface circuit.

In the I/O interface, during the wrap-back test, the DAU 18 must be made unavailable to any deserialized data received by the receiver during wrap-back test mode. Accordingly, provision must be made to lock out the received, reconverted data so long as the wrap back test input data is being shunted directly into the DAU 18. The parallel data 4 exiting the DAU 18 with the test parallel data so that they might be compared for error analysis. Although not shown, the BIST unit may contain an error counter and and error trace buffer. These devices would determine the bit-error rate and characterize the error type or source. The results of the analysis may be accessed externally via an error report bus.

Figure 4:
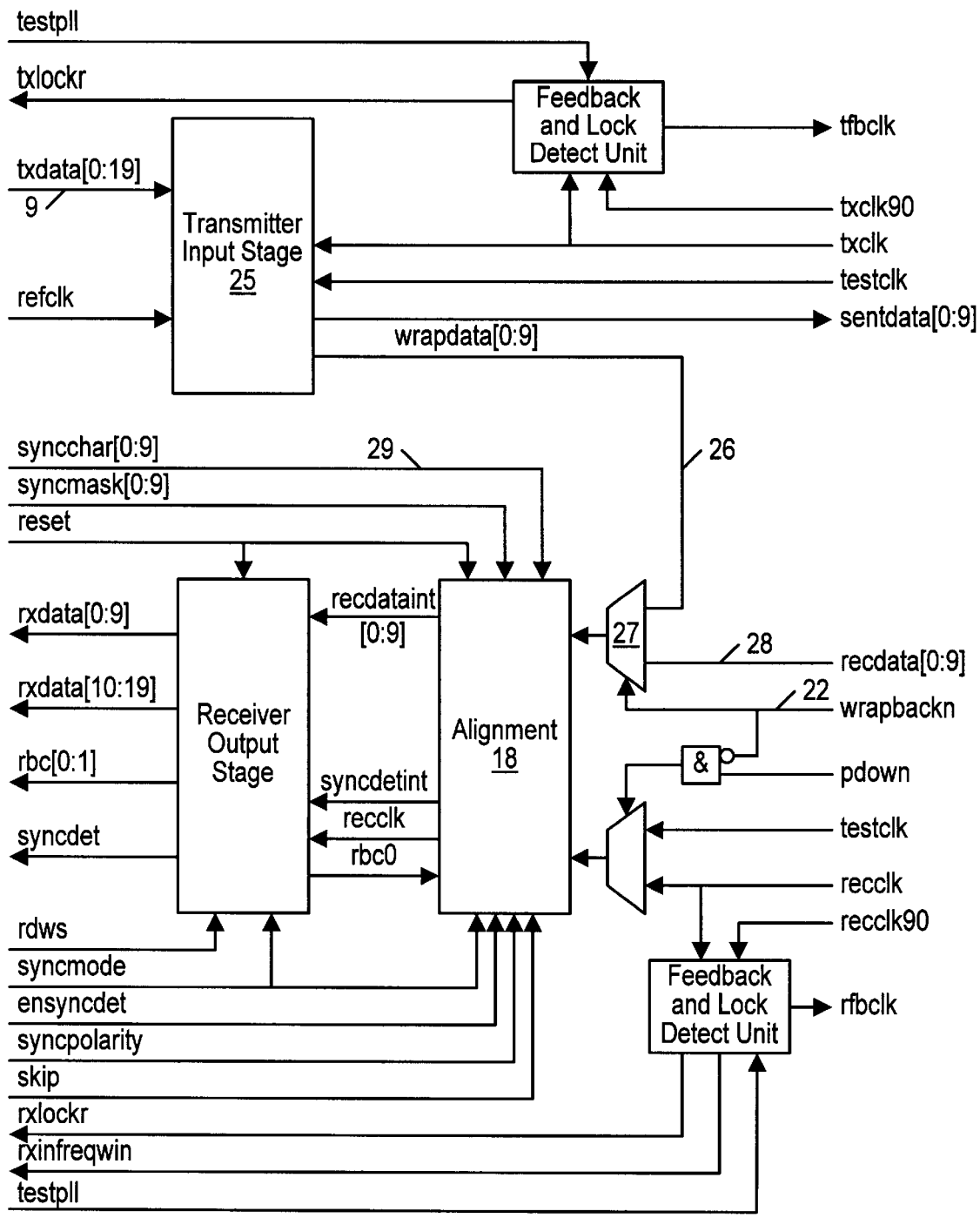
FIG. 4 is block diagram of a preferred embodiment of the wrap-back system of this invention.

FIG. 4 is a systems diagram of a wrap back system wherein parallel data 9 enters the transmitter input stage 25 of the transmitter section of the serializer 11. While FIG. 4 shows 20 bit wide parallel input data, it is understood that the width of the parallel data may be of any length. When the wrap back signal is asserted, the input parallel data 9 or a portion thereof is shunted from the transmitter input stage 25 prior to the data being serialized. The shunted data, or wrapdata 26, is directed to a switching ciruit 27 wherein, upon assertion of the wrapback request signal 22, deserialized parallel data 28 from the deserializer is shunted off, and the wrapdata 26 is directed into the data alignment unit 18. The switching circuit 27 may of any type designed to shunt the parallel wrap data to the DAU while turning off the parallel data from the deserializer. Such designs are known by persons skilled in electronic circuit design. The devices used in the circuit include FET, bipolar, or other semiconductor devices or combinations also known by those of skill in the art, suitable to perform the required function, and to ensure a D.C. balance in the circuit. The encoded alignment pattern is extracted from the wrap data and the wrapdata is aligned and synchronized with an alignment pattern 29. The aligned parallel data is then compared to the original input parallel data 9. An optional bit error report may be obtained from the BIST 20.

Although the present invention described herein and above are preferred embodiments, it is understood that after having read the above description, various alternatives will become apparent to those persons skilled in the art. For example, the wrap back system and method of this invention may be used in any integrated I/O device having both a transmitter and a receiver in the same macrocell or core, and where input data is converted from a first format to provide output data at a second for output, and where data is received in the second format and reconverted to the first format. Accordingly, the wrap back system and method of this invention may be used in analog/digital to digital/analog I/Os, and in telecommunications inverse multiplexer I/Os. We therefore wish our invention to be defined by the scope of the appended claims as broadly as the prior art will permit, and in view of the specification and drawings.

We claim:

1. A wrap back test system for detection of intra-domain errors of an integrated I/O interface core of an integrated circuit, comprising in operative combination:
   a) an integrated transmitter, said transmitter comprising:
      i) a transmitter input stage for receiving transmitter input data, said input data encoded with an alignment pattern, said input data having a first format and said input data having a particular timing, and
      ii) a transmitter converter stage for converting said input data into transmitter output data, said output data having a second format;
   b) an integrated receiver, said receiver comprising:
      i) a receiver converter stage for receiving said output data for conversion of said output data to said first format to provide received reconverted data, ii) a receiver alignment stage for extracting said alignment pattern from said received reconverted data, and for aligning said received re converted data to conform to said particular timing of said input data, c) a first switching circuit in electrical cooperation with said transmitter input stage having a first open condition, and a second closed condition, said second closed condition for shunting input test data to said receiver alignment stage to provide wrap back data to said receiver alignment stage, said first switching circuit second closed condition being enabled upon assertion of a wrap back signal to the I/O interface core;

d) a second switching circuit in electrical cooperation with said receiver alignment stage having a first open position to permit receipt of received reconverted data from said receiver converter stage, and a second closed condition for receiving said wrap back data for alignment of said wrap back data to provide output test data, and for halting receipt of said received reconverted data upon assertion of said wrap back signal to the I/O interface core; and e) an error analysis circuit for comparing said output test data with said input test data.

2. A wrap back test system as in claim 1 wherein said I/O interface core is a serializer/deserializer interface for converting alignment coded parallel formatted data to serial formatted data for transmission, and for converting serial formatted data to parallel formatted data for reception.

3. A wrap back test system as in claim 2 further comprising an in-core built-in self-test (BIST) circuit for providing said input test data to said transmitter input stage, wherein said input test data is pseudo-random and alignment encoded.

4. A wrap back test system as in claim 1 wherein said first switching circuit includes semiconductor switching devices, said first switching circuit being designed to maintain the direct current balance of the I/O interface core.

5. A wrap back test system as in claim 4 wherein said semiconductor switching devices are MOSFET transistors.

6. A wrap back test system as in claim 1 wherein said second switching circuit includes semiconductor switching devices, said second switching circuit being designed to maintain the direct current balance of the I/O interface core.

7. A wrap back test system as in claim 6 wherein said semiconductor switching devices are MOSFET transistors.

8. A wrap back test system as in claim 1 wherein said error analysis circuit is disposed in an in-core built-in self-test (BIST) and includes an error counter and and error trace buffer for determining and reporting the bit-error rate of the output test data as compared to the input test data.

9. A wrap back test system for detection of intra-domain errors of an integrated I/O interface circuit core of an integrated circuit, comprising in operative combination:

a) means for transmitting data, said transmitting means comprising:
  i) a transmitter input means for receiving input data, said input data encoded with an alignment pattern, said input data having a first format and said input data having particular timing, and
  ii) a data conversion means for converting said input data from said first format into output data having a second format;

b) means for receiving transmitted data, said receiving means comprising:
  i) a receiver conversion means for converting said transmitted output data from said second format to said first format to provide received reconverted data, and ii) a receiver data alignment means for extracting said encoded alignment pattern from the reconverted data, and for aligning the reconverted data to conform to said input data timing;

c) a first data switching means for switching input test data from said transmitter input means to said receiver data alignment means upon assertion of a wrap back signal to the I/O interface circuit core, said input test data encoded with said alignment pattern;

d) a second switching means for receiving said input test data from said transmitter input means for decoding of said alignment pattern for alignment of said input test data to provide output test data, and for halting receipt of said received reconverted data upon assertion of said wrap back signal to the I/O interface circuit core; and e) an error analysis means for comparing said output test data with said input test data.

10. A wrap back test system as in claim 9 wherein said I/O interface circuit core is a serializer/deserializer interface for converting alignment coded parallel formatted data to serial formatted data for transmission, and for converting serial formatted data to parallel formatted data for reception.

11. A wrap back test system as in claim 9 further comprising an in-core built-in self-test (BIST) means for providing said input test data to said transmitter input means, wherein said input test data is pseudo-random and alignment encoded.

12. A wrap back test system as in claim 9 wherein said first data switching means includes semiconductor switching devices, said first data switching means being designed to maintain the direct current balance of the I/O interface circuit core.

13. A wrap back test system as in claim 12 wherein said semiconductor switching devices are MOSFET transistors.

14. A wrap back test system as in claim 9 wherein said second data switching means includes semiconductor switching devices, said second data switching means being designed to maintain the direct current balance of the I/O interface circuit core.

15. A wrap back test system as in claim 14 wherein said semiconductor switching devices are MOSFET transistors.

16. A wrap back test system as in claim 9 wherein said error analysis means is disposed in a built-in self-test (BIST) means and includes an error counter and an error trace buffer for determining and reporting a bit-error rate of the output test data as compared to the input test data.

17. A wrap back test method for detection of intra-domain errors of an integrated I/O interface core of an integrated circuit, comprising the following steps:

a) providing said integrated I/O interface core having both a transmitter section and a receiver section, said transmitter section comprising:
  i) a transmitter input stage for receiving transmitter input data, said input data encoded with an alignment pattern, said input data having a first format and said input data having a particular timing, and
  ii) a transmitter converter stage for converting said input data into transmitter output data, said output data having a second format, and said receiver section comprising:
  iii) a receiver converter stage for receiving said transmitter output data for conversion of said output data to said first format to provide received reconverted data,
  iv) a receiver alignment stage for decoding said alignment pattern from said received reconverted data, and for aligning said received reconverted data to conform to said transmitter input data timing, said transmitter section further comprising:
  v) a first switching circuit in electrical cooperation with said transmitter input stage having a first open condition, and a second closed condition, said second closed condition for shunting transmitter input test data to said receiver alignment stage to provide wrap back data to said receiver alignment stage, said first switching circuit second closed condition being enabled upon assertion of a wrap back signal to the I/O interface core, and said receiver section further comprising:
  vi) a second switching circuit in electrical cooperation with said receiver alignment stage having a first open position to permit receipt of received reconverted data from said receiver converter stage, and a second closed condition for receiving said wrap back data for alignment of said wrap back data to provide output test data, and for halting receipt of said received reconverted data, said second closed condition being enabled upon assertion of said wrap back signal to the I/O interface core, and an error analysis circuit for comparing said output test data with said input test data.

b) asserting a wrap back test enable signal to the I/O interface core to enable said second closed condition of said first switching circuit, and to enable said second closed condition of said second switching circuit;

c) inputting test data into said transmitter input stage, said input test data encoded with said alignment pattern;

d) shunting said input test data directly to said receiver alignment stage to bypass said transmitter converter stage;

e) decoding said alignment pattern from said shunted input data for alignment of said input test data;

f) aligning said input test data to provide aligned output test data; and g) comparing said aligned output test data with said input test data.

18. A wrap back test method as in claim 17 wherein said I/O interface core is a serializer/deserilizer I/O interface core.

19. A wrap back test method as in claim 17 wherein said step of asserting said wrap back test enable signal is initiated off-chip via a wrap back enable pin on the integrated circuit accessible off-chip.

20. A wrap back test method as in claim 17 wherein said comparing step is performed by an in-core built-in self-test (BIST) circuit, said BIST circuit includes an error counter and an error trace buffer for determining and reporting a bit-error rate of the output test data as compared to the input test data.

* * * * *